Figure 3:
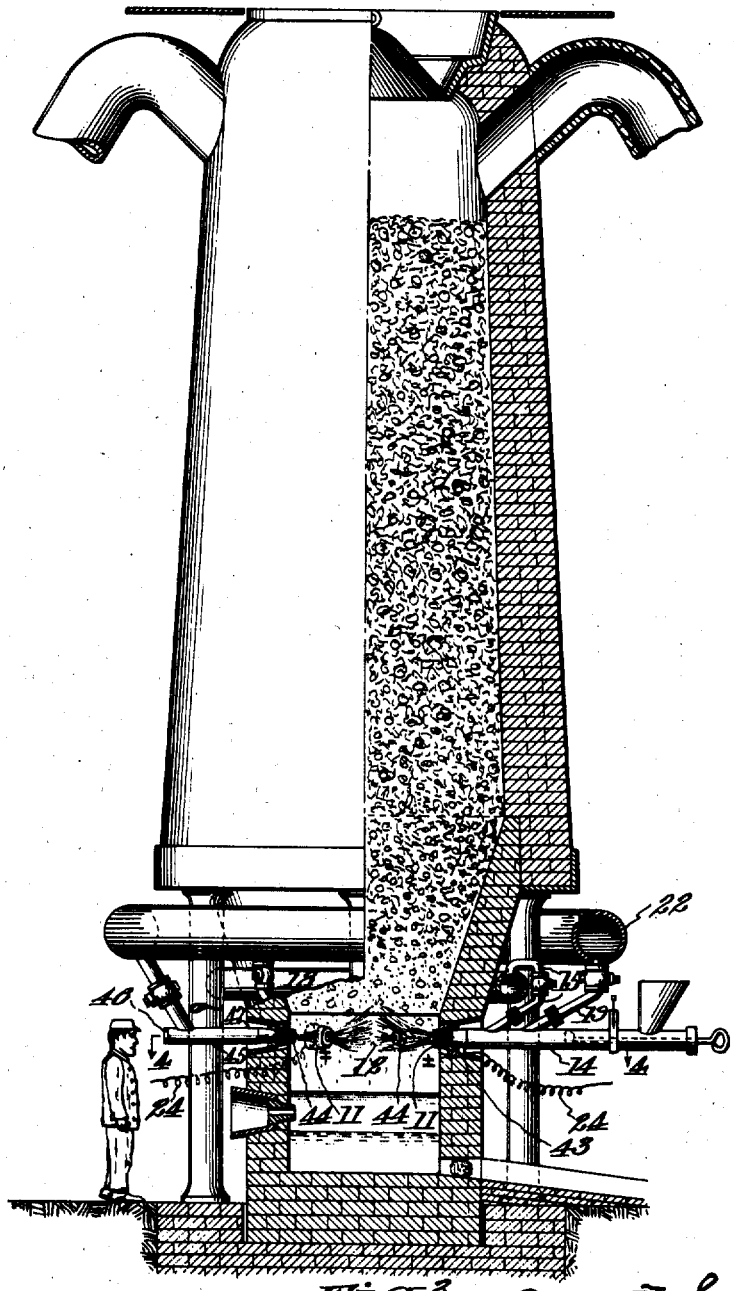

Aug. 25, 1925. Re. 16,149
G. T. SOUTHGATE
PROCESS AND APPARATUS FOR INTRODUCING ELECTRIC ENERGY INTO A SPACE OF ACTION
Original Filed March 8, 1922 2 Sheets-Sheet 1
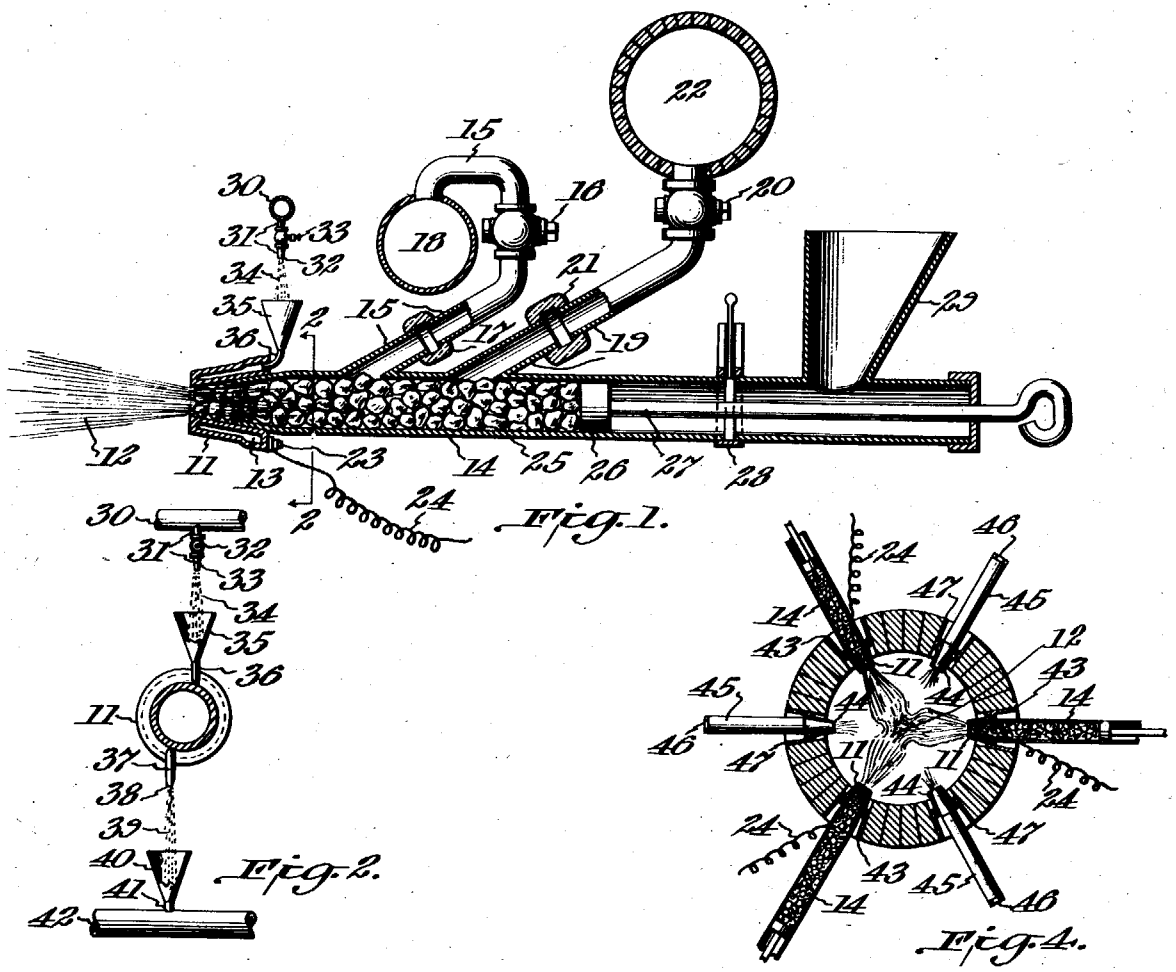
Inventor:
George T. Southgate,
By Byrne, Townsend & Brickenstein,
Attorneys.

Aug. 25, 1925. Re. 16,149

G. T. SOUTHGATE

PROCESS AND APPARATUS FOR INTRODUCING ELECTRIC ENERGY INTO A SPACE OF ACTION

Original Filed March 8, 1922 2 Sheets-Sheet 2

Inventor:

George T. Southgate,

By Byrne Townsend & Brickenstein,

Attorneys.

Reissued Aug. 25, 1925.

Re. 16,149

UNITED STATES PATENT OFFICE.

GEORGE T. SOUTHGATE, OF ANNISTON, ALABAMA.

PROCESS AND APPARATUS FOR INTRODUCING ELECTRIC ENERGY INTO A SPACE OF ACTION.

Original No. 1,443,439, dated January 30, 1923, Serial No. 541,988, filed March 8, 1922. Application for reissue filed November 3, 1924. Serial No. 747,694.

*To all whom it may concern:*

Be it known that I, GEORGE T. SOUTHGATE, a citizen of the United States, residing at Anniston, in the county of Calhoun and State of Alabama, have invented certain new and useful Improvements in Processes and Apparatus for Introducing Electric Energy into a Space of Action, of which the following is a specification.

This invention relates to a process and apparatus in which combustion flames, blown from nozzle-electrodes, are employed for conducting, directing and controlling electric arcs, and in which the gases thus heated are utilized for transmitting the electrically supplied heat along with the combustion heat to wherever desired. For blowing the flames from the nozzle electrodes, a mixture of a combustible material such as coal gas with a combustion supporting gas such as air is forced through the nozzle electrodes. The invention has for one of its objects to improve the efficiency of the use of electricity in smelting, industrial chemistry, melting, welding and the like, especially in those applications where intense electric heating may be advantageously superimposed upon fuel heating.

Another object of my invention is to provide a process and apparatus, for the use of electricity in furnace operations, which may be applied to existing types or even existing erected units of non-electric furnaces with but relatively little change in the construction of said furnaces except the addition thereto of my improved electric apparatus and the use therewith of my improved process.

Another object of my invention is to provide a process and apparatus, for the use of electricity in furnace operations, which may be conveniently put out of use without hindering the operation of the furnace with other sources of heat; as for example in those seasons when the use of electricity drawn from hydroelectric power plants on streams of very variable flow may be less economical than the use of fuel in the furnace.

Another object of my invention is to replace the cumbrous, expensive and rapidly consumed electrodes of ordinary electric furnaces by small, easily mounted, less expensive and less rapidly consumed electrodes, in which the wearing parts are separate from the main body of the electrode, are composed of carbon and are readily and continuously replenishable.

Another object of my invention is to avoid the employment in electric furnaces of low electromotive forces and heavy currents and the consequently required massive conductors, by using the properties of my improved process and apparatus wherein the working portions of the circuits, within the furnace, have high effective resistance and consequently give high heat generation with relatively small currents.

Another object of my invention is to provide a means of performing, in an intensified degree, operations which utilize the special properties of electric arcs, such as producing waves in the ether for radio transmission of messages and of power, the detection of waves in the air or in the ether by the "response" of arc flames, and the radiation of large amounts of light and heat into space for use per se.

With these and other objects in view, my invention consists in the novel steps and combinations of steps constituting the process, and in the novel combinations of parts constituting the apparatus; all as will be more fully hereinafter disclosed and described with reference to the two accompanying drawings forming a part of this specification, and particularly pointed out in the claims.

The novel features of my invention relate to processes and apparatus which utilize the electrically conducting properties of gases heated in close proximity to conducting electrodes, and the energy-distributing properties of said gases, as means of introducing electric currents and advantageously transmitting the energy thereof wherever desired.

In my improved process and apparatus the heating of the gases for rendering them electrically conducting may be accomplished in any approved manner; but the method I prefer is to cause a portion of the heating to take place at and near the points where said gases are introduced into the space of action, by combustion thereof; and the apparatus which I prefer to use for the accomplishment of said purpose is a set of fittings combining in themselves the functions of gas nozzles and of electrodes bringing electricity of suitable high electromotive force to said gases.

In the foregoing and following explanations, wherever the word gas or gases is used in connection with the tuyères or electrodes, I refer not only to clear gases, but also to any suitable matter in a gaseous state or in a finely divided state so that it resembles gas in the freedom of its movement, as for example smoke, dust clouds or sprays of liquid.

One of the known properties of a combustion flame is that it is capable of conducting away electricity from conductors charged at suitably high voltages, i. e., a flame can be made to act as a conductor of an electric current. Because of the high electric resistance of flame, additional heat is generated therein by such electric current, in amount proportional to the square of the current. It is also known that in any gas ambient to electric conductors, an effect can be produced by the impressing of high electromotive forces on said conductors and that this effect is apparently one of atomic disintegration or "ionization." Surrounding such conductors there may be seen under sufficiently dim illumination an artificial light, variously called "corona," "electric glow," "electrode rays," etc. At magnitudes of increasing electromotive force dependent upon the form, size, spacing, disposition, surface and other features of the conductors and upon the composition, temperature, pressure and other properties of the gas, this effect becomes very pronounced, and especially the electric conductivity of the gas increases. The dissipation of electric energy into heat in the gas is also greatly increased with increasing electromotive force.

This increase of electromotive force, with its corresponding increase of heat dissipation, may be continued until upon reaching a certain voltage per unit of distance between electrodes, a disruptive discharge or arc is established. A substantially lower voltage suffices for starting this disruptive discharge in flame than in the atmosphere, but in either case a much higher electromotive force is required to maintain the arc than is needed for causing an equal current in either loose or aggregate masses of solid resistance materials. Conversely, therefore, we may employ in practical furnaces for the same amount of electric power and heating much smaller currents and far less massive conductors and electrodes, by projecting combustion flames into unobstructed spaces thereof and establishing relatively long electric arcs in such wise as to be directed in and along these flames.

In my invention disclosed in United States Letters Patent Numbers 1,373,639 (granted Apr. 5, 1921) and 1,369,714 (granted Feb. 22, 1921) for respectively a process and an apparatus for the fixation of gases by means of electric discharges or arcs, I have taken advantage of this gaseous conduction of electricity for the purpose of causing the atomic decomposition of the gases treated and their susceptibility to differing recomposition—also for the purpose of momentarily heating by the electric currents to such high temperatures as are conductive to their combination, gases having relatively little mutual affinity.

In the invention disclosed herein any direct chemical action exerted upon the inducted gases by the ionizing effect and heat of the electric arcs is not the purpose sought, but is only incidental; said purpose actually being the use of the electric conductance of the hot gases as the means of introducing the currents of electricity for converting the electric energy into heat and other forms of energy, and, in heating apparatus, the distribution of said heat wherever desired by the flow of said gases. It is also the object of this invention to utilize in heating apparatus the heat that is generated by the previously mentioned combustion of the gases inducted through the electrodes.

In the accompanying drawings, Fig. 1 is a mid-sectional view of a combined electrode and gas nozzle constituting one form of my improved apparatus. Fig. 2 is a detail of piping forming a part of the apparatus of Fig. 1, but not convenient to show therein; being a section in the vertical plane indicated by the line 2—2. Fig. 3 represents a type of furnace in the operation of which my improved process and apparatus may be applied; the upper portion left of the central vertical axis being an elevation and the lower portion of that side and all of the right-hand side being a mid-section. Fig. 4 is a horizontal section of the furnace shown in Fig. 3, in the plane indicated by the line 4—4. Similar numbers refer to similar parts throughout the several views.

In the drawings, hollow casting 11 is a nozzle, in and through which gases are partly burned and inducted into the space-of-action 12. Casting 11 serves also as the electrode mentioned hereinbefore and hereinafter in the phrases "electrodes provided with holes," "through holes in electrodes" etc.; and wherever the words "nozzles", "electrodes" or "nozzle-electrodes" are mentioned below in the description or claims of my invention fittings similar to casting 11 are meant. In order to prevent being melted or rapidly eroded, casting 11 preferably should be cooled by any suitable means; and I prefer to employ therefor the circulation of water in the hollow space 13 of said casting. The method and means of supplying said water is explained hereinafter. A metal blowpipe 14 is connected to nozzle 11; and the gases inducted through said nozzle are supplied by way of said blowpipe. Combustible-gas pipe 15 is connected at one end to blowpipe 14; and in said pipe 15 there are inserted valve 16 and hollow electric insulator 17, which insulates blowpipe 14 from all parts of pipe 15 except the end thereof adjacent to said blowpipe. The other end of pipe 15 is connected to any suitable source of a combustible gas under pressure, as the main 18. An oxidizing-gas pipe 19 is also connected at one end to blowpipe 14; and in said pipe 19 there are inserted valve 20 and hollow electric insulator 21, which insulates blowpipe 14 from all parts of pipe 19 except the end thereof adjacent to said blowpipe. The other end of pipe 19 is connected to any suitable source of an oxidizing gas under pressure, as the main 22. Any suitable oxidizing gas may be employed, but in the majority of cases I prefer to use air. The means of supplying combustible gas to main 18 and oxidizing gas to main 22 form no part of my present invention, and the usual practices in such cases may be followed.

Electric terminal 23 is mounted on nozzle-electrode 11; and electric connection is made as by the wire 24, from a suitable source of electromotive force.

Nozzle 11, and the portion of blowpipe 14 near said nozzle are filled with pieces 25 of electrically conducting thermally refractory material, such as carbon. Any kind of carbon may be employed, and in any suitable form adapted to be moved through the blowpipe and nozzle; but I prefer to use coke because of its cheapness, and I prefer to use coarse lumps because of the high electric conductivity, great permeability for gases and sufficient mobility of that form.

Blowpipe 14 is extended in the direction opposite from the discharge end of nozzle 11, into a cylinder in which a piston 26, driven by a piston-rod 27, is fitted. A slide valve 28 is mounted in and intersects blowpipe 11, and near the rear end of the blowpipe is provided a suitable means of feeding thereinto the aforementioned pieces of conducting material, as by the hopper 29.

For the cooling-water supply to nozzle-electrode 11 suitable provision must be made, whereby the nozzle shall not be electrically grounded or short-circuited by either the water or its conduit. I prefer to employ therefor an arrangement in which the water is delivered both to and from nozzle 11 in broken streams, and in which there is no metallic or other solid connection between nozzle 11 and either the water-supply system or the drain system. It is known that a broken stream of water, as from a hose, may with impunity be played on a conductor charged at very high voltage, and that because of the separation of the drops no appreciable electric conduction takes place in said broken stream.

Referring to Fig. 2 and also, in part to Fig. 1, from water-supply header 30 is taken supply pipe 31; which terminates in a nozzle 32 capable of breaking up the discharged water into a spray 34 of small drops. Valve 33 is used to regulate the quantity of water discharged by pipe 31. The sprayed water falls into funnel 35 and is carried to nozzle-electrode 11 by pipe 36. From nozzle 11 the spent water is similarly discharged to the drainage system via pipe 37, nozzle 38, spray 39, funnel 40, pipe 41 and drain header 42.

When my process and apparatus are applied in a smelting furnace, nozzle 11 may be mounted in a hollow ring 43, which may be water-cooled by a method and apparatus similar to that provided for nozzle 11 itself and shown by Fig. 2. Ring 43 must be insulated from other metal parts of the furnace.

In Fig. 3 and Fig. 4 are shown an application of my new process and apparatus in the operation of a furnace similar to a standard iron blast furnace; the general construction and operation of said furnace, other than the process and apparatus for introducing electric energy, not being embraced in my invention. My improved apparatus is mounted in the furnace at any suitable level, as in the plane of the regular furnaces tuyères 44 and air blowpipes 45.

An advantage is gained from thus placing the nozzle-electrodes in the plane of and spaced among the tuyères, because of the resultant thorough commingling of the gases from the nozzle-electrodes with the air from the tuyères. A further advantage is gained from this arrangement in that the usual peep-hole or "eyesight" 46 in the end of each air blowpipe 45 may be used to inspect the condition, and the effect within the furnace, of not only the air blasts from said blowpipes but also of the flames from nozzle-electrodes 11. A still further advantage obtains in those cases where a furnace previously heated wholly by fuel is to be heated wholly or partly by electricity, or where a furnace already having my improved electric apparatus is to be operated for a season with the heat from fuel only, in that the usual hollow rings 47 employed in mounting the tuyères 44 may be constructed and cooled similarly to rings 43 in which electrode-nozzles 11 are supported; and that in such similar rings, tuyères and electrode-nozzles with their respective accessories, may be interchanged at will.

The operation of my new process and apparatus is as follows:—

Nozzle-electrode 11 and a portion of blowpipe 14 being filled with lumps of coke, combustible-gas valve 16 and oxidizing-gas valve 20 are partly opened and the gases allowed to flow through the nozzle-electrode. The mixed gas is then ignited by any suitable means, burning among and through the coke lumps and beyond the end of nozzle 11, and heating the said coke. At the beginning, an excess of oxidizing gas over that required for perfect union with the combustible gas may be used, in order to promote the quick heating of the coke by the partial combustion thereof. After heating the coke, however, I prefer to regulate the valves of the two gas-supply pipes in such wise that there is insufficient oxidizing gas for perfect combustion of the other gas, but a sufficient total flow of gases to cause very hot flame in the nozzle-electrode. During the further operation of the apparatus, the coke in the nozzle-electrode and in the blowpipe is gradually consumed, and the assembly thereof somewhat loosened. In order to keep this coke content reasonably compact in the nozzle and blowpipe, piston 26 should be occasionally pushed forward by hand, by means of piston-rod 27. When necessary the coke may be replenished through hopper 29, after drawing back piston 26 to the end of its travel and closing valve 28. The valve is then reopened and the new charge of coke pushed up against the old coke by means of the piston. During these operations on the apparatus either the electromotive force mentioned below must be temporarily removed, or the operator must stand on a well insulated platform, for his safety.

While I prefer usually to follow the method just described, in which a separately introduced combustible gas is employed to form matter for combustion flame, and coke employed for renewable wearing surface-of-contact between said gas and the balance of the electric circuit, yet my invention includes as one of its equivalent methods of application the employment of lumps of bituminous coal or the like, in lieu of the coke and the said combustible gas. This method is equivalent for the reason that the bituminous coal when so used will distill and form simultaneously and continuously both coke and the combustible gas, and will form both in those zones of blowpipe 14 and nozzle 11 where desired.

The apparatus being in steady operation as above described, a circuit of suitably high electromotive force from an external source is now completed by way of nozzle-electrode 11 and the flame therefrom which plays into the space-of-action 12. When the process and apparatus are used in a furnace, the circuit from one nozzle-electrode may be completed by way of its flame to the flame from one or more other similar nozzle-electrodes and through said other flames to said other nozzle-electrodes. For example there may be a total of three such electrodes and three flames, giving a three-phase connection, as shown in Fig. 3 and Fig. 4. When the process and apparatus are used in heating, cutting, welding or burning metal, only one nozzle-electrode and its accessories need be used; and the electric circuit may be closed by way of the said metal. When the process and apparatus are employed in utilizing the special properties of the arc, such as in producing or detecting waves in the ether for radiodynamic purposes, producing, detecting or amplifying sound in the air or telephonic electric current variations in a circuit, light and heat radiation, and all other uses of intensified arcs, two or more nozzle-electrodes may be used to form respectively single-phase or polyphase circuits according to the requirements of the application. The nozzle-electrodes may thus be used as torches in space, for general lighting or heating with the same construction and mode of operation characteristic of the other forms of the invention.

When electric currents flow through the matter of the flames as described, the properties of electric arcs are intensified. This is especially true of the heating action of said arcs—additionally to the heat of combustion of the flame—and of the heat-transmitting properties of the combined arc and combustion flame. A greater amount of electric energy can be poured into such a combustion-flame arc; and the resistance between electrodes and arcs is reduced in my process and apparatus by the high heating of the large surfaces of coke within the electrode-nozzle, with the result that the $I^2R$ heat in the circuit is generated less at the electrodes and more in the flame, where desired.

In order to regulate the input of electric energy to the flames in my new process and apparatus, we may vary the electromotive force impressed on the nozzle-electrodes; whereby the quotient $E^2/R$, which equals the electric energy converted into heat, will be changed. Or we may conveniently vary the divisor of this formula, by varying the input of gases to the flames.

The consumption of the wearing portion of the electrodes in my apparatus, i. e., of the coke, is relatively slow, for the reason that the burning mixed gas passing through the electrode-nozzle and the coke-mass is a reducing gas; there being a deficit of oxidizing gas in the mixture, as stated hereinbefore.

When my new process and apparatus are used in a furnace, any proportion of the heating thereof may be done by the burning of the combustible portion of the matter inducted through the nozzle-electrodes, and by the burning of any other fuel supplied to the furnace; the balance of the heat being supplied by the conversion of electric energy thereinto in the space-of-action affected by the operation of my new process and improved apparatus.

It is obvious that those skilled in the art may vary the steps of the process, as well as the arrangement of parts constituting the apparatus, without departing from the spirit of my invention; and they may apply my new process and apparatus to purposes additional to those specified. Therefore, I do not wish to be limited to the above disclosure except as may be required by the claims. It will be seen also that in the operation of my new process, it is necessary to use improved apparatus similar to what I have described above, and that in properly employing my improved apparatus it is necessary to operate by a process similar to the foregoing new method. For this reason, I have described the process and the apparatus together as one invention.

I claim:—

1. The process of converting electrical energy into radiant energy in the presence of combustion, which comprises forcing mobile combustible and oxidizing matter through a nozzle containing a porous, electrically conducting, thermally refractory filling; producing a combustion flame of said matter, and impressing upon said filling an electromotive force suitable to cause electric arc conduction therefrom into and along said combustion flame.

2. The process of supplying heat to a furnace which consists in converting electrical energy into heat by forcing mobile matter, both combustible and oxidizing, through nozzles containing within their bores bodies of electrically conducting, thermally refractory solids, producing combustion flames of said matter in said furnace, and impressing upon said bodies electromotive forces suitable to cause electric arc conduction therefrom into and along said combustion flames.

3. The process of supplying electric energy to a furnace which consists in inducting streams of matter into said furnace through electrodes having longitudinal holes containing bodies of electrically conducting, thermally refractory solids; said matter being a mixture of combustible substance with an oxidizing gas; said oxidizing gas being not sufficient in proportion to oxidize said combustible substance completely; partly but not completely burning said matter while passing through said electrodes; and impressing upon said electrodes electromotive forces suitable to cause electric arc conduction from said bodies into and along said streams.

4. In smelting, the process of supplying to a furnace heat additional to that generated therein by chemical means, which consists in forcing mobile matter, both combustible and oxidizing, into said furnace through nozzles containing within their bores, electrically conducting, thermally refractory solids, producing combustion flames of said matter, and impressing upon said bodies electromotive forces suitable to cause electric arc conduction therefrom into and along said combustion flames.

5. The process of converting electrical energy into radiant energy in the presence of combustion, which comprises forcing mobile matter, both combustible and oxidizing, through a nozzle having within its bore bodies of fixed carbon, producing a combustion flame of said matter, and impressing upon said bodies an electromotive force suitable to cause electric arc conduction therefrom into and along said combustion flame.

6. The process of converting electrical energy into radiant energy in the presence of combustion, which comprises forcing mobile matter, both combustible and oxidizing, through a nozzle having within its bore bodies of carbonaceous matter capable upon heating of becoming changed to fixed carbon and of liberating combustible gases which are added to said mobile matter, producing a combustion flame of said mobile matter, and impressing upon said bodies an electromotive force suitable to cause electric arc conduction therefrom into and along said combustion flame.

7. The process of utilizing cheap materials in electrodes which consists in inducting through said electrodes, in holes therethrough containing bodies of electrically conducting, thermally refractory solids, streams of fluid matter; burning said matter in said streams; and impressing suitable electromotive forces on said electrodes to cause electric arc conduction in said streams.

8. The process of utilizing cheap materials in electrodes which consists in inducting through said electrodes, in holes therethrough containing bodies capable upon heating of becoming carbonized to electrically conducting, thermally refractory solids, streams of fluid matter; burning said matter in said streams; and impressing suitable electromotive forces on said electrodes to cause electric arc conduction in said streams.

9. The process of directively applying eletrical energy which comprises inducting streams of combustible and oxidizing matter through holes in electrodes, directing said streams into the desired space of action of said energy, burning said matter by combustion in said electrodes and in said streams, and impressing upon said electrodes electromotive forces suitable to cause electric arc conduction therefrom into and along said streams.

10. The process as claimed in claim 9, wherein the supply of combustible and oxidizing matter is so controlled that the oxidizing matter is not sufficient in proportion to burn the combustible matter completely.

11. The process as claimed in claim 1, in combination with the step of controlling the supply of electric energy to the combustion flame by varying, in the same direction as the desired change in magnitude of electric energy, the rate of supply of combustible matter.

12. The method of supplying radiant energy to a space to be heated, which comprises providing a continuous supply of energy from combustion flames directed into said space, and periodically impressing upon said combustion flames electromotive forces suitable to cause electric arc conduction therealong and into said space.

13. The process as claimed in claim 1, employed in heating a furnace continuously with fuel and intermittently with both electricity and fuel.

14. Apparatus comprising an electrode having a longitudinal passageway terminating at the arcing end of the electrode, means for forcing combustible and oxidizable mobile matter through said passageway, said passageway being so proportioned with respect to the volumes of mobile matter normally employed that the combustion flame of said matter will contact with the arcing end of the electrode, and means for impressing upon said electrode an electromotive force suitable to cause electric arc conduction therefrom into and along the combustion flame.

15. Apparatus comprising a nozzle-electrode having a longitudinal bore extending therethrough, a porous mass of electrically conducting material in said bore, means for forcing a combustible mixture through said bore, means for impressing upon said mass an electromotive force suitable to cause electric arc conduction therefrom into the flame produced from said combustible mixture, and means for advancing said porous mass through said bore.

16. A nozzle-electrode comprising a tubular shell of refractory material, a nozzle thereon, means for supplying a mixture of combustible and oxidizing matter to said tubular shell, means for supplying bodies of electrically conducting, thermally refractory solids to said tubular shell, and means for impressing an electromotive force upon said bodies.

17. A nozzle-electrode comprising a tubular body of refractory material, a nozzle for said body and having a bore of less cross-sectional area than that of said body, an electrically conducting, thermally refractory filling in and providing longitudinal passages through said body, means for forcing fluid matter through said passages, means for impressing an electromotive force upon said filling, and means on said body and spaced from the nozzle end thereof for replenishing said filling.

18. Apparatus for converting electric energy to radiant energy and heat, said apparatus comprising a hollow nozzle, means for supplying mobile matter, both combustible and oxidizing, to said nozzle, whereby a combustion flame may be projected from said nozzle, a porous, electrically conductive, thermally refractory filling in said nozzle, and means for impressing upon said filling an electromotive force suitable to cause electric arc conduction therefrom into and along said combustion flame.

19. Apparatus for converting electric energy to radiant energy in the presence of combustion, said apparatus comprising a plurality of nozzles, solid bodies of electrically conducting, thermally refractory material in said nozzles, means for supplying combustible material and oxidizing gas to said nozzles at such pressure that combustion flames may issue from said nozzles and in contact with at least some of said solid bodies, and means for supplying electricity to said bodies at electromotive forces suitable to cause electric arc conduction therefrom into and along said combustion flames.

20. In apparatus for supplying electric energy to a furnace, the combination with electrically conducting nozzles arranged to feed fluid matter into said furnace, of induction tubes connected to said nozzles; means for continuously inducting fluid matter through said nozzles by way of said induction tubes; bodies of solid, electrically conducting, thermally refractory material in the bores of and in electric connection with said nozzles and said induction tubes; means for so regulating said inducted fluid matter that it will burn while in contact with at least some of said solid bodies in said bores; and means for supplying electricity to said nozzles at electromotive force suitable to cause electric arc conduction from said solid bodies into said fluid matter and along the streams thereof.

21. In electrode apparatus adapted to be conveniently installed in and removed from a furnace at will, the combination with nozzles resembling and spatially interchangeable with furnace tuyères, and made of electrically conducting material; of means for producing combustion flame in and from said nozzles; and means for supplying electricity of suitable electromotive force to said nozzles.

22. Apparatus as claimed in claim 19 in combination with means for varying the volume and intensity of the combustion flames.

23. Apparatus as claimed in claim 18 wherein said nozzle resembles and is spatially interchangeable with a furnace tuyère.

24. In electric arc apparatus adapted to consume relatively cheap electrode materials, the combination with electrodes having longitudinal holes, of bodies of electrically conducting, thermally refractory solids in said holes; means for inducting fluid matter through said holes; means for burning said matter by combustion while and after passing through said holes; and means for impressing on said electrodes electromotive force of magnitude suitable to cause electric arc conduction into said inducted matter and along the streams thereof.

25. In electric arc apparatus adapted to consume relatively cheap electrode materials, the combination with electrodes having longitudinal holes, of bodies capable upon heating of becoming carbonized to electrically conducting, thermally refractory solids, in said holes; means for inducting fluid matter through said holes; means for burning said matter by combustion while and after passing through said holes; and means for impressing on said electrodes electromotive force of magnitude suitable to cause electric arc conduction into said inducted matter and along the streams thereof.

26. Apparatus as claimed in claim 19, wherein said nozzles are so arranged that the electric circuit shall be from a nozzle to and along its flame, to the flame of another nozzle, and so to the said other nozzle.

In testimony whereof, I affix my signature.

GEORGE T. SOUTHGATE.